United States Patent [19]

Yu

[11] Patent Number: 5,123,628
[45] Date of Patent: Jun. 23, 1992

[54] WATER SAVING VALVE

[76] Inventor: Jim Yu, 19215 Woodlands La, Huntington Beach, Calif. 92648

[21] Appl. No.: 702,080

[22] Filed: May 17, 1991

[51] Int. Cl.⁵ .......................... F16K 47/04; F15D 1/14
[52] U.S. Cl. ...................................... 251/209; 138/42; 138/44; 239/590.3
[58] Field of Search .................. 251/117, 209; 137/246.12; 138/45, 46, 42, 44; 239/590.3, 590, 581.1

[56] References Cited

U.S. PATENT DOCUMENTS

| | | |
|---|---|---|
| 1,222,726 | 4/1917 | Brickell . |
| 2,688,515 | 9/1954 | Filliung . |
| 3,291,154 | 12/1966 | Bounds . |
| 4,130,135 | 12/1978 | Moore . |
| 4,191,332 | 3/1980 | DeLangis et al. . |
| 4,282,899 | 8/1981 | Dunckhorst . |
| 4,311,279 | 1/1982 | Jette . |
| 4,427,177 | 1/1984 | Constantinescu et al. . |
| 4,530,467 | 7/1985 | Bueno . |
| 4,645,496 | 2/1987 | Oscarsson ................ 251/117 X |
| 4,995,155 | 2/1991 | Gentry et al. . |

Primary Examiner—Arnold Rosenthal
Attorney, Agent, or Firm—Spensley Horn Jubas & Lubitz

[57] ABSTRACT

A water saving valve is provided for attachment between a water supply pipe and a showerhead. The water saving valve has a spool fitted in a bore defined by first and second walls having first and second openings, respectively. The first and second walls separate the bore from a pipe passageway and a showerhead passageway, respectively. A circumferentially recessed groove is provided in a central portion of the spool, the recessed groove defined by a core which has a diameter approximately 80% of the diameter of the spool. The core has a valve passageway which, when the spool is fitted in the bore in a first portion, substantially horizontally aligns with the first and second openings to allow water to flow unrestricted therethrough. The spool may be rotated by a handle to different positions to regulate the quantity of water allowed to flow through the showerhead.

8 Claims, 1 Drawing Sheet

U.S. Patent  June 23, 1992  5,123,628
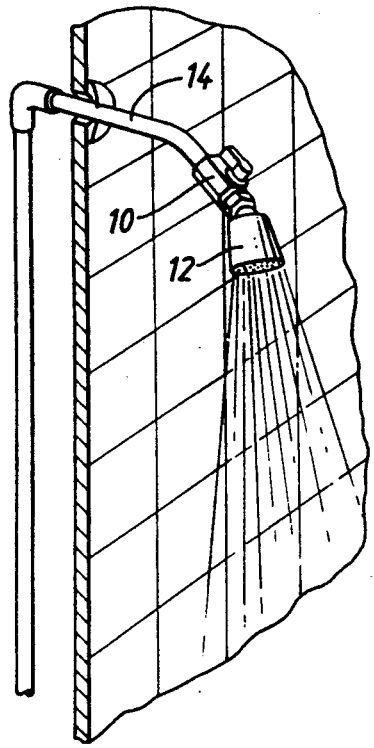
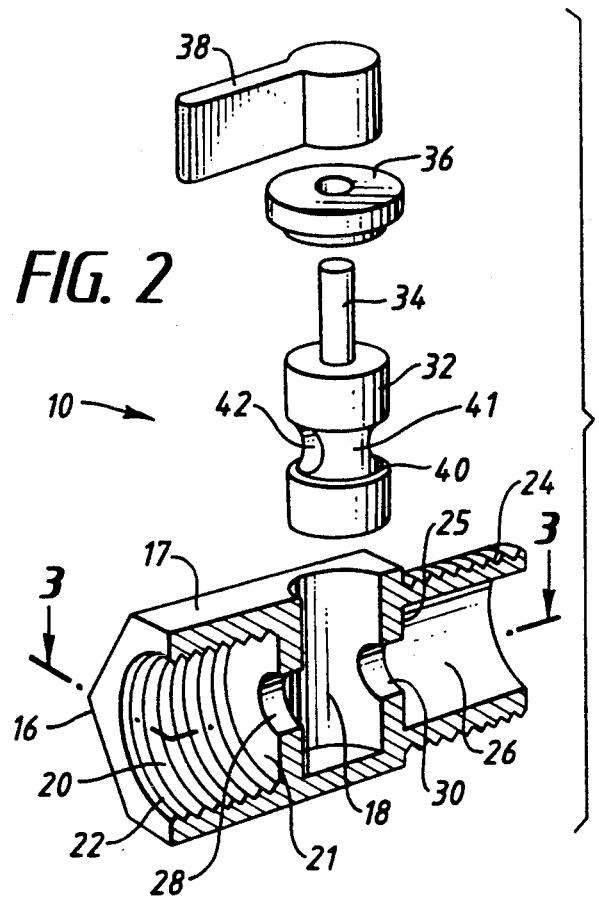
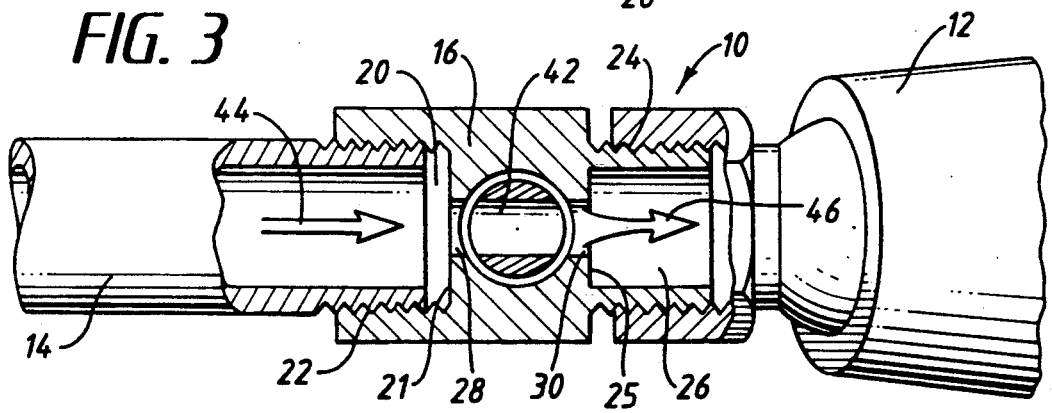
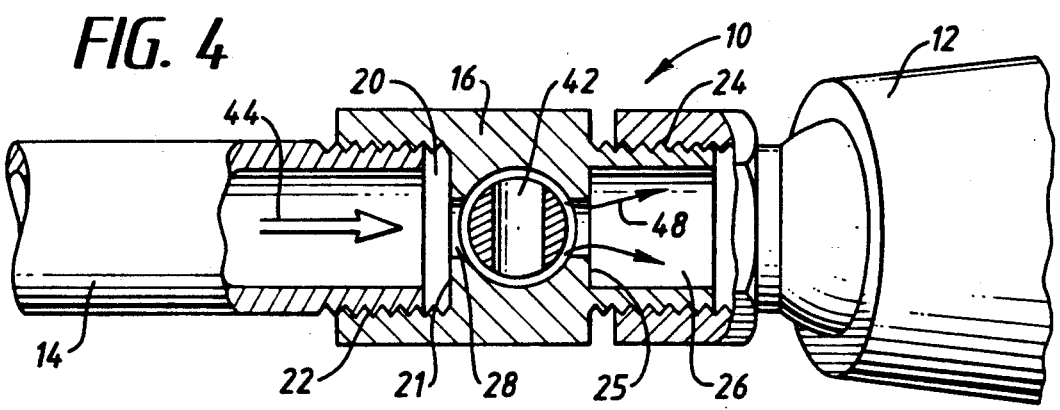

WATER SAVING VALVE

FIELD OF THE INVENTION

The present invention relates to a water saving valve, and more particularly, to a water saving valve which is separate from a water supply pipe and a showerhead. The water saving valve may be attached between the water supply pipe and the showerhead and may be manipulated in order to regulate the flow of water through the valve during a shower.

BACKGROUND OF THE INVENTION

Taking a shower is one of the more pleasurable activities enjoyed by people all over the world. Aside from the hygienic benefits of cleaning one's body, a shower also provides a soothing and comfortable feeling. Unfortunately, a shower normally requires the use of more water than taking a bath in a tub. This is because a typical shower normally requires at least three different phases. If the water is allowed to run at full flow without restriction (i.e., at 100%) during these three phases, a large quantity of water would be used inefficiently.

In the first phase, a person normally wets his or her body, and possibly his or her hair, prior to soaping and shampooing. In the second phase, the person applies soap (and shampoo) throughout his or her body (and hair). In the third phase, the person rinses the soap (and shampoo) from his or her body.

Some people may go through at least two additional phases to shampoo their hair because they prefer to finish the shampoo and rinse for their hair before they soap and rinse their bodies. Thus, a first additional phase is required in which the person would apply shampoo to his or her hair. In a second additional phase, the person would then rinse the shampoo from his or her hair. If the person wishes to apply a conditioner to his or her hair, additional phases are required to apply and rinse the conditioner.

Thus, in the above-mentioned phases, there are at least three phases during which water does not need to run unrestricted at full flow from the showerhead—soaping, shampooing, and conditioning. Since it normally takes at least six to eight minutes for a person to soap, shampoo, and apply conditioner, a large quantity of water can be saved if the water is not running unrestricted at full flow from the showerhead during these three phases.

A simple solution to saving water during these three phases would be to shut off the water supply during these three phases. However, many people prefer not to shut off the water supply for a number of reasons. First, they prefer to have a small quantity of water flowing from the showerhead while soap, shampoo and conditioning is applied to their body and hair, so as to keep the body and hair wet. Maintaining the body and hair wet makes it easier and more comfortable to apply the soap, shampoo and conditioner. Second, if the water supply is shut off and turned on again after soaping, shampooing, or conditioning, the water temperature will probably be different and the water temperature must be readjusted, causing the person great inconvenience. Accordingly, many people merely twist the showerhead to one side, thereby allowing water to flow continuously and causing water to be needlessly drained.

In the past, showerheads have been provided which incorporate an adjustable valve for regulating the flow of water therethrough. These adjustable valves typically operate to completely block off the water supply at some time during its operation. However, it is undesirable to provide a valve which completely blocks off the supply of water when the water is still turned on. This is because the water being supplied builds up at the valve and causes the build-up of undesirable pressure in the water supply pipe, causing the water supply pipe to leak after such extended use. The construction of these prior art valves is also generally complicated, and there is a need to provide a simple water saving valve which can be manufactured at low cost.

SUMMARY OF THE INVENTION

Accordingly, the present invention provides a water saving valve which operates in a manner that a user cannot completely shut off the supply of water. The valve of the present invention is separate from the water supply pipe and the showerhead and may be attached therebetween to regulate the flow of water through the showerhead. The valve of the present invention allows the existing showerhead and water pipe to be used without any adjustments or modifications, thereby providing a simplified method of obtaining the desired water control through a showerhead. The valve of the present invention also has a simple construction and consists of a small number of parts, which enables it to be manufactured at low cost.

The water saving valve according to this invention is attached between a water supply pipe and showerhead. The valve comprises a valve body having a bore, a first wall, and a second wall. A horizontal pipe passageway is separated from the bore by the first wall and a horizontal showerhead passageway is separated from the bore by the second wall. A first opening is provided in the first wall, and a second opening is provided in the second wall, the first and second openings being horizontally aligned with each other. The valve further comprises a spool having a shaft disposed at one end for receiving a handle; the spool having a recessed groove provided at a central portion thereof and defined by a core having a diameter which is smaller than the diameter of the spool. The core has a valve passageway formed therethrough, the valve passageway being substantially horizontally aligned with the first and second openings.

The handle may be adjusted to turn the spool to one of two positions. In a first position, the valve passageway connects the pipe passageway and the showerhead passageway to allow 100% of the water to flow unrestricted therethrough. In a second position, the spool is rotated so that the valve passageway does not communicate with the pipe and showerhead passageways of the valve body. In the second position, the water will flow from the pipe passageway through the groove to the showerhead passageway, thereby restricting the water flow to approximately 20% of the full unrestricted water flow.

BRIEF DESCRIPTION OF THE DRAWINGS

The invention will be described in connection with one embodiment thereof with reference to the accompanying drawings in which:

FIG. 1 is a perspective view of the water saving valve of the present invention operating in conjunction with a water supply pipe and a showerhead in a shower stall;

FIG. 2 is a perspective view of the components comprising the water saving valve of the present invention;

FIG. 3 is a cross-sectional side view of the water saving valve of FIG. 2 taken along lines 3—3 thereof showing the valve in a position which allows 100% of the full water flow to pass therethrough unrestricted; and FIG. 4 is a cross-sectional side view of the water saving valve of FIG. 2 taken along lines 3—3 thereof, showing the valve in a position which restricts the water flow to 20% of the full unrestricted water flow.

DESCRIPTION OF THE PREFERRED EMBODIMENT

An exemplary water saving valve according to this invention is shown in FIGS. 1-4 and designated by the numeral 10. Referring to FIG. 1, the water saving valve 10 is provided between a water supply pipe 14 and a showerhead 12. The water flow from the water supply pipe 14 is regulated by the valve 10 and is then released through the showerhead 12.

The construction of the water saving valve 10 is described in greater detail in connection with FIGS. 2-4. Referring to FIG. 2, the valve 10 comprises a valve body 16 which may be made from aluminum or brass. The valve body 16 is provided with a bore 18 which is oriented vertically and extends from an upper surface 17 of the valve body 16. A threaded pipe passageway 20 is provided at a water supply pipe receiving end of the valve 10, the passageway 20 having threads 22 on its inside surface for receiving one end of the water supply pipe 14 (see FIGS. 3 and 4). A first wall 21 separates the pipe passageway 20 and the bore 18. At the other end, a showerhead receiving end, of the valve body 16 is provided a showerhead passageway 26. The outer surface of the showerhead passageway 26 is provided with threads 24 for allowing a showerhead 12 to be screwed thereon. A second wall 25 separates the showerhead passageway 26 and the bore 18. The first and second walls 21 and 25 are each provided with circular openings 28 and 30, respectively, which are aligned so as to provide a direct passageway therethrough, as explained below.

A spool 32 which is made from a plastic material has a shaft 34 at one end for receiving a handle 38. A washer 36 is provided along the shaft 34 between the handle 38 and the spool 32. The spool 32 has a recessed groove 40 cut circumferentially along its central portion thereof. The recessed groove 40 is cut by about 20% from the cylindrical outer surface of the spool 32 so that the diameter of an inner core 41 is approximately 80% of the diameter of the spool 32. An opening or valve passageway 42 is formed through the core 41. The diameter of the valve passageway 42 is made to be substantially identical to the diameter of the openings 28 and 30 in the first and second walls 21 and 25, respectively.

The spool 32 is fitted within the bore 18 so that, in a first position shown in FIG. 3, the valve passageway 42 is aligned with the openings 28 and 30 to provide an uninterrupted passageway for water to flow therethrough. Accordingly, 100% of the water flow indicated by arrow 44 from the water supply pipe 14 passes unrestricted through the pipe passageway 20, the first opening 28, the valve passageway 42, the second opening 30, and into the showerhead passageway 26 as indicated by the arrow 46 and into the showerhead 12 where 100% of the water flow will be released through the showerhead 12. When a person desires to restrict the flow of water during the soaping, shampooing and conditioning phases of a shower, the person merely turns the handle 38 to rotate the spool 32 to a second position shown in FIG. 4, where the valve passageway 42 is not aligned with the openings 28 and 30. In this second position, the water flow from the water supply pipe 14 indicated by arrow 44 passes through the pipe passageway 20 and the first opening 28, travels around the recessed groove 40, and exits through the second opening 30 and into the showerhead passageway 26 as indicated by smaller arrows 48. In this position, only 20% of the full unrestricted flow water delivered from the water supply pipe 14 is allowed to pass through to the showerhead 12.

Unlike the conventional water valves, the above-described water saving valve of the present invention does not completely shut off the supply of water from the water supply pipe 14. This allows the water from the water supply pipe 14 to be maintained at the same temperature throughout the shower, even during the time when the water flow is restricted to 20% of the full unrestricted water flow. A further advantage from allowing some water to flow through at all times is that minimal pressure is built up in the water pipe 14 so that the of a leak in the water supply pipe 14 is minimized.

While the invention has been shown and described with reference to a preferred embodiment thereof, it will be appreciated by those having skill in the art that variations in form and detail may be made therein without departing from the spirit and scope of the invention.

What is claimed is:

1. A water saving valve attached between a water supply pipe and a showerhead, the valve comprising:

a valve body having a bore defined by opposing first and second vertical walls, a horizontal pipe passageway separated from the bore by the first wall for receiving water flow from the water supply pipe, a horizontal showerhead passageway separated from the bore by the second wall for flowing water to the showerhead, a first opening provided in the first wall, and a second opening provided in the second wall, the first and second openings substantially horizontally aligned with each other; and a spool fitted for rotation within the bore, the spool having a shaft disposed at one end for receiving a handle, a recessed groove cut around the entire circumference of a central portion of the spool for allowing water to flow continuously from the pipe passageway to the showerhead passageway, the recessed groove further defining a core having a diameter which is smaller than the diameter of the spool, the core having a valve passageway formed therethrough for directly connecting the first and second openings.

2. The water saving valve of claim 1, wherein the valve may be adjusted to a first position in which the valve passageway is substantially horizontally aligned with the first opening and the second opening, and to a second position in which the valve passageway is not substantially horizontally aligned with the first opening and the second opening.

3. The water saving valve of claim 2, wherein the water from the water supply pipe flows unrestricted from the pipe passageway through the valve passageway to the showerhead passageway when the valve is in the first position.

4. The water saving valve of claim 2, wherein the water from the water supply pipe flows from the pipe passageway along the recessed groove to the showerhead passageway when the valve is in the second position.

5. The water saving valve of claim 4, wherein the flow of water through the valve is less than the full unrestricted water flow from the water supply pipe.

6. The water saving valve of claim 5, wherein the flow of water through the valve is 20% of the full unrestricted water flow from the water supply pipe.

7. The water saving valve of claim 2, wherein the valve may be adjusted to the first and second positions by rotating the handle.

8. The water saving valve of claim 1, wherein the pipe passageway has threads on an internal surface for engaging one end of the water supply pipe and the showerhead passageway has threads on an external surface for engaging one end of a showerhead.

* * * * *